June 6, 1933. G. B. WATKINS 1,913,223
LAMINATED GLASS
Filed July 13, 1929
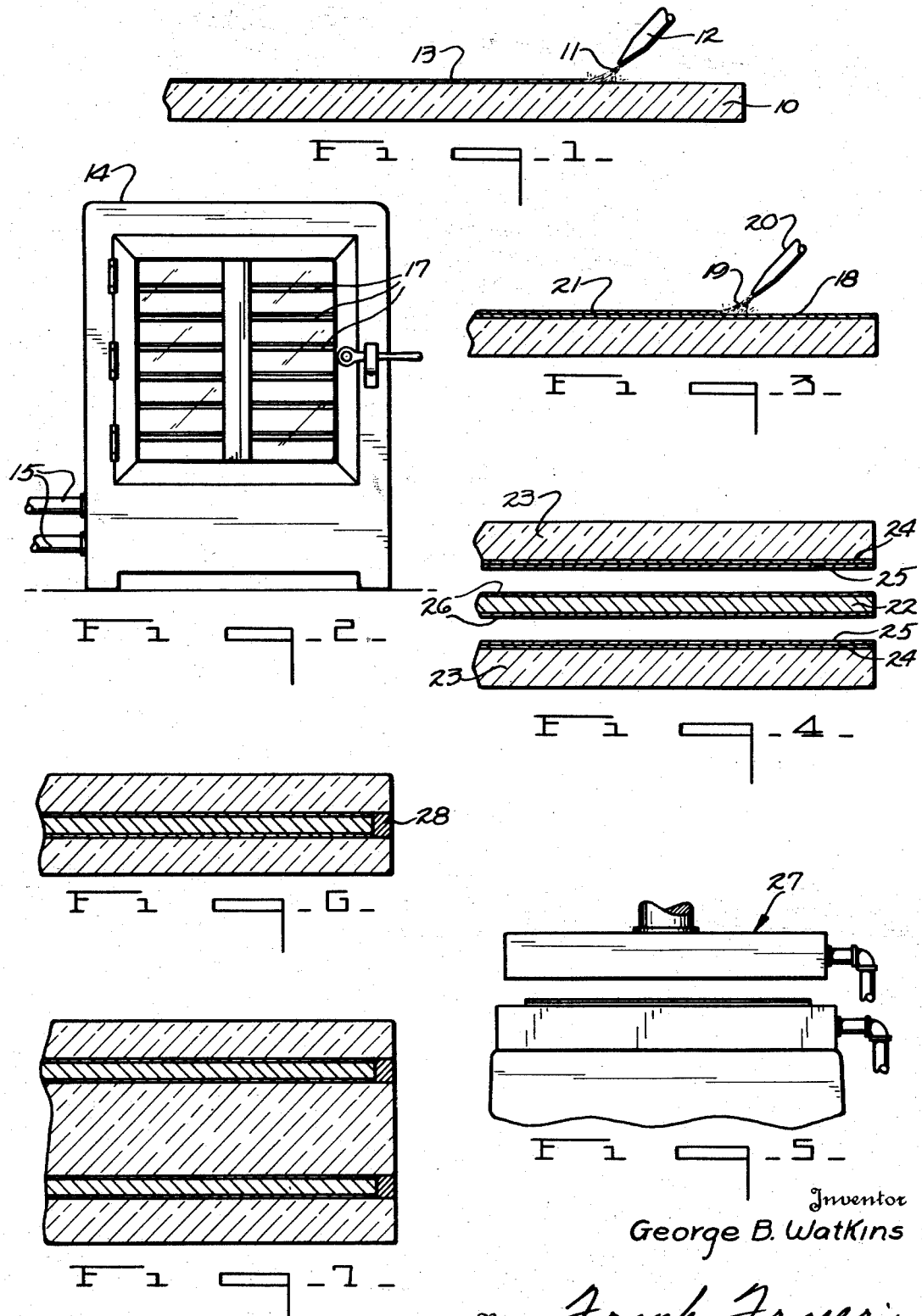
Inventor
George B. Watkins
By Frank Fraser
Attorney Patented June 6, 1933

1,913,223

UNITED STATES PATENT OFFICE

GEORGE B. WATKINS, OF TOLEDO, OHIO, ASSIGNOR TO LIBBEY-OWENS-FORD GLASS COMPANY, OF TOLEDO, OHIO, A CORPORATION OF OHIO

LAMINATED GLASS

Application filed July 13, 1929. Serial No. 377,954.

The present invention relates to a process for producing as a new article of manufacture, a sheet of laminated glass.

The term "laminated glass" is used to designate a composite structure ordinarily formed from two or more sheets of glass and one or more interposed non-brittle membranes formed from a material such as a cellulose composition material. Although on the surface it appears to be a relatively easy matter to join these laminations into a composite non-shatterable or non-scatterable structure, however, due to the differences in the characteristics of the materials to be joined, namely, glass and a cellulose composition material, it is a difficult matter to properly and permanently bond the laminations together. For a laminated sheet of this character to be satisfactory from a commercial standpoint, the laminations must first be intimately bonded throughout their entire areas in a permanent manner. The finished sheet must also be able to withstand varying climatic conditions without being adversely affected. That is, the sheet must be able to withstand relatively high temperatures without bubbling, etc. and relatively low temperatures without becoming unduly brittle. It can, therefore, be seen that satisfactory joining of these unlike surfaces presents a real problem.

It is an aim of the present invention, therefore, to provide a process for producing laminated glass wherein a mixture is utilized that has the desirable ability to adhere exceptionally well to the glass and likewise to the non-brittle membrane.

Another object of the invention is to provide such a process wherein a skin coat is formed on the glass sheets from a mixture of gelatin, nitro-cellulose, and suitable solvents, said skin coats adhering firmly to the glass surface and also capable of adhering well to the non-brittle sheet.

Other objects and advantages of the invention will become more apparent during the course of the following description when taken in connection with the accompanying drawing.

In the drawing wherein like numerals are employed to designate like parts throughout the same, Fig. 1 is a fragmentary sectional view illustrating diagrammatically the formation of a skin coat on a sheet of glass, Fig. 2 is a diagrammatic representation of a drying cabinet, Fig. 3 is a sectional view illustrating the application of a bond inducing medium to the skin coat, Fig. 4 is a fragmentary vertical sectional view through the laminations before they have been united, the laminations being placed in spaced relation for the sake of clearness, Fig. 5 represents diagrammatically a press, and Figs. 6 and 7 are fragmentary sectional views of two types of commercial product.

Referring to Fig. 1, the numeral 10 designates a sheet of glass, either one or both of whose surfaces may be ground and polished, or not, as desired. As shown, a solution 11 is being sprayed upon the sheet by means of a gun or the like 12 in a manner to create a deposit 13. The coated sheet of glass is then arranged in a suitable temperature and humidity controlled compartment or chamber 14 which is provided with the conduits 15 to allow proper control of the conditions within the cabinet. The numeral 16 is used to designate a plurality of coated sheets arranged in the cabinet for treatment, the cabinet being illustrated as provided with a glass closure.

The drying of the deposit 13 creates what is called in the art a "skin coat" and this is shown at 18 in Fig. 3. In accordance with this invention, an improved skin coat is used in that the skin coat, theoretically at least, and it seems to be borne out in practice, has a component which sticks very well to the glass surfaces and also a material which, when treated with a suitable bond inducing medium, will become bonded to the non-brittle sheet in an excellent manner. The mixture from which the skin coat is produced is preferably formed from nitro-cellulose, gelatin, a suitable solvent for the nitro-cellulose such as acetone, a suitable solvent for the gelatin such as water, and a suitable mutual solvent such as acetic acid. A mixture which I have used with excellent results contained substantially equal proportions of nitro-cellulose and gelatin. The percentage composition of the solution mixture used is as follows:

|  | Per cent |
|---|---|
| Gelatin | 1 |
| Nitro-cellulose | 1 |
| Acetic acid | 70 |
| Water | 14 |
| Acetone | 14 |

It seems in making up this solution that the percents of the different components in the mixture are relatively close and apparently the best results are obtained when mixed in the proper order. This was accomplished by first adding a 5% solution of nitro-cellulose in acetone into a fairly large volume of acetic acid. The acetic acid was constantly stirred while the nitro-cellulose solution was added. Then a 5% solution of gelatin in water was added to the nitro-cellulose, acetic acid solution which likewise was constantly stirred. In both instances the addition of the nitro-cellulose solution and the gelatin solution was stopped at the first indication of precipitation.

I have set forth above complete instructions as to how to make a mixture suitable for forming the type of skin coat desired, but obviously changes can be made here and there without avoiding this invention. For instance, different solvents can be used or modified percentages, although I have found the percentages given above and mixture of the ingredients in the order named give very exceptional results. The solution mixture of nitro-cellulose and gelatin is then sprayed as described in connection with Fig. 1. After the skin coat has been properly dried in the cabinet, a bond inducing medium 19 is sprayed thereon as by means of a spray gun or the like 20. The spray 19 creates a film 21 of the bond inducing medium. Although different bond inducing mediums can be used, I have found that a mixture of substantially 30% dibutyl phthalate, 30% butyl carbitol, and 40% carbitol is very satisfactory. In addition to spraying or otherwise applying such as by dipping, brushing, etc., the liquid upon the skin coat, the sheet of pyroxylin plastic 22 or other non-brittle membrane may be likewise treated. As shown in Fig. 4, the two sheets of glass 23 each carries a skin coat 24 of my improved mixture and a film of bond inducing medium 25. The pyroxylin plastic sheet or other plastic material 22 also carries the films 26 of the bond inducing medium. It is not necessary that both the skin coat and the pyroxylin plastic sheet be sprayed as either one or the other can be coated with the film of bond inducing medium. After the laminations have been treated and arranged in proper superimposed relationship, as indicated in Fig. 4, to produce a sandwich, the sandwich is positioned between the platens of the press 27 and there subjected to the combined action of heat and pressure.

Upon the application of heat and pressure, the bond inducing medium causes sufficient plasticization between the non-brittle sheet and the nitro-cellulose content of the skin coat at least to obtain an excellent bond between the said non-brittle membrane and skin coats. It will, of course, be understood that the skin coat has previously been made to adhere to the glass so that a composite structure of exceptional strength and permanency is produced. No doubt the nitro-cellulose content of the skin coat sticks or adheres to the glass and likewise the gelatin content to the non-brittle membrane, but theoretically at least the gelatin component will stick well to the glass and the nitro-cellulose content to the pyroxylin plastic sheet, which of course gives an ideal condition. It will be borne in mind that the gelatin and nitro-cellulose components of the skin coat are so intermingled and joined together that there is no marked line of division between the two.

In Fig. 6, the finished sheet formed from the sandwich in Fig. 4 is illustrated and to protect the bond between the laminations, a seal 28 is arranged around the edge thereof. Fig. 7 illustrates a bullet-proof type of glass which can be made in exact accordance with the process above described.

I claim:

1. The process of producing laminated glass, consisting in making a mixture composed of the following ingredients and in the approximate percentages of gelatin 1%, nitro-cellulose 1%, mutual solvent 70%, solvent for the gelatin 14%, and solvent for the nitro-cellulose 14%, then forming a skin coat from such mixture on one surface each of two sheets of glass, then interposing a non-brittle membrane between the skin-coated surfaces of the glass sheets, and uniting the sandwich thus formed to produce a composite structure.

2. The process of producing laminated glass, consisting in making a mixture composed of the following ingredients and in the approximate percentages of gelatin 1%, nitro-cellulose 1%, acetic acid 70%, water 14%, and acetone 14%, then forming a skin coat from such mixture on one surface each of two sheets of glass, then interposing a non-brittle membrane between the skin-coated surfaces of the glass sheets, and uniting the sandwich thus formed to produce a composite structure.

3. As a new article of manufacture, a sheet of laminated glass comprising two sheets of glass, a non-brittle membrane interposed therebetween, and a skin coat arranged between the non-brittle membrane and each sheet of glass, said skin coats being formed from a mixture of gelatin 1%, nitro-cellulose 1%, mutual solvent 70%, solvent for the gelatin 14%, and solvent for the nitro-cellulose 14%.

Signed at Toledo, in the county of Lucas and State of Ohio, this 11th day of July, 1929.

GEORGE B. WATKINS.